(12) United States Patent
Huang et al.

(10) Patent No.: US 11,016,673 B2
(45) Date of Patent: *May 25, 2021

(54) OPTIMIZING SERVERLESS COMPUTING USING A DISTRIBUTED COMPUTING FRAMEWORK

(71) Applicant: Cisco Technology, Inc., San Jose, CA (US)

(72) Inventors: Xinyuan Huang, San Jose, CA (US); Johnu George, San Jose, CA (US); Marc Solanas Tarre, San Jose, CA (US); Komei Shimamura, London (GB); Purushotham Kamath, San Jose, CA (US); Debojyoti Dutta, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/931,302

(22) Filed: May 13, 2020

(65) Prior Publication Data

US 2020/0272338 A1    Aug. 27, 2020

Related U.S. Application Data

(63) Continuation of application No. 15/943,640, filed on Apr. 2, 2018, now Pat. No. 10,678,444.

(51) Int. Cl.
| | |
|---|---|
| *G06F 3/06* | (2006.01) |
| *G06F 9/48* | (2006.01) |
| *G06F 16/25* | (2019.01) |

(52) U.S. Cl.
CPC ............ *G06F 3/0613* (2013.01); *G06F 3/067* (2013.01); *G06F 3/0661* (2013.01); *G06F 9/4843* (2013.01); *G06F 16/256* (2019.01)

(58) Field of Classification Search
None
See application file for complete search history.

(56) References Cited

U.S. PATENT DOCUMENTS

| | | |
|---|---|---|
| 6,493,804 B1 | 12/2002 | Soltis et al. |
| 7,607,032 B1 | 10/2009 | Marek et al. |
| (Continued) | | |

FOREIGN PATENT DOCUMENTS

| | | |
|---|---|---|
| CN | 102073546 A | 7/2013 |

OTHER PUBLICATIONS

"AWS Lambda Developer Guide," Amazon Web Services Inc., Hamtad, May 2017, 416 pages.

(Continued)

*Primary Examiner* — Joshua Joo
(74) *Attorney, Agent, or Firm* — Polsinelli PC

(57) ABSTRACT

Aspects of the technology provide improvements to a Serverless Computing (SLC) workflow by determining when and how to optimize SLC jobs for computing in a Distributed Computing Framework (DCF). DCF optimization can be performed by abstracting SLC tasks into different workflow configurations to determined optimal arrangements for execution in a DCF environment. A process of the technology can include steps for receiving an SLC job including one or more SLC tasks, executing one or more of the tasks to determine a latency metric and a throughput metric for the SLC tasks, and determining if the SLC tasks should be converted to a Distributed Computing Framework (DCF) format based on the latency metric and the throughput metric. Systems and machine-readable media are also provided.

20 Claims, 7 Drawing Sheets

(56) References Cited

U.S. PATENT DOCUMENTS

| | | | |
|---|---|---|---|
| 8,949,847 | B2 | 2/2015 | Kim et al. |
| 9,338,097 | B2 | 5/2016 | Anand et al. |
| 9,436,443 | B2 | 9/2016 | Chiosi et al. |
| 2012/0131591 | A1 | 5/2012 | Moorthi et al. |
| 2013/0110943 | A1* | 5/2013 | Menon ................. G06Q 10/107 709/206 |
| 2013/0254777 | A1 | 9/2013 | Branson et al. |
| 2014/0143787 | A1 | 5/2014 | Bostic et al. |
| 2015/0082308 | A1 | 3/2015 | Kiess et al. |
| 2015/0355951 | A1 | 12/2015 | Cherkasova et al. |
| 2015/0363467 | A1* | 12/2015 | Cao ..................... G06F 16/2272 707/719 |
| 2016/0112502 | A1 | 4/2016 | Clarke et al. |
| 2016/0179560 | A1 | 6/2016 | Ganguli et al. |
| 2016/0212017 | A1 | 7/2016 | Li et al. |
| 2016/0328273 | A1 | 11/2016 | Molka et al. |
| 2017/0024245 | A1 | 1/2017 | Goh et al. |
| 2017/0026441 | A1 | 1/2017 | Moudy et al. |
| 2017/0200113 | A1 | 7/2017 | Cherkasova |
| 2017/0264564 | A1 | 9/2017 | Suchter et al. |
| 2017/0293653 | A1 | 10/2017 | Harris et al. |
| 2018/0103088 | A1 | 4/2018 | Blainey et al. |
| 2018/0203794 | A1 | 7/2018 | Voccio et al. |
| 2019/0079846 | A1 | 3/2019 | Shaik et al. |
| 2019/0149480 | A1* | 5/2019 | Singhvi ................. H04L 47/78 709/226 |
| 2019/0250958 | A1 | 8/2019 | Kumar et al. |
| 2019/0303207 | A1* | 10/2019 | Vadapandeshwara ...................... G06F 9/5044 |
| 2019/0306692 | A1 | 10/2019 | Garty et al. |
| 2019/0340033 | A1 | 11/2019 | Ganteaume |

OTHER PUBLICATIONS

"AWS Serverless Multi-Tier Architectures," Amazon Web Services Inc., Nov. 2015, 20 pages.
"Cisco and Intel High-Performance VNFs on Cisco NFV Infrastructure," White Paper, © 2016 Cisco I Intel, Oct. 2016, 7 pages.
"Cisco NSH Service Chaining Configuration Guide," Cisco Systems, Inc., Jul. 28, 2017, 11 pages.
"Cloud Functions Overview," CloudFunctions Documentation, Mar. 21, 2017, 3 pages; https://cloud.google.com/functions/docs/concepts/overview.
"Cloud-Native VNF Modelling," Open Source Mano, © ETSI 2016, 18 pages.
"Network Functions Virtualisation (NFV); Use Cases," ETSI, GS NFV 001 v1.1.1, Architectural Framework, © European Telecommunications Standards Institute, Oct. 2013, 50 pages.
"Understanding Azure A Guide for Developers," Microsoft Corporation, Copyright © 2016 Microsoft Corporation, 39 pages.
"Xilinx Demonstrates Reconfigurable Acceleration for Cloud Scale Applications at SC16," PR Newswire, Nov. 7, 2016, 9 pages; http://news.sys-con.com/node/3948204.
Burt, Jeff, "Intel Begins Shipping Xeon Chips With FPGA Accelerators," eWeek, Apr. 13, 2016, 3 pages.
Capdevila, Pujol, P., "Deployment of NFV and SFC scenarios," EETAC, Master Thesis, Advisor: David Rincon Rivera, Feb. 17, 2017, 115 pages.
Chen, Yu-Ting, et al., "When Apache Spark Meets FPGAs: A Case Study for Next-Generation DNA Sequencing Acceleration," The 8th USENIX Workshop on Hot Topics in Cloud Computing, Jun. 20, 2016, 7 pages.
Ersue, Mehmet, "ETSI NFV Management and Orchestration—An Overview," Presentation at the IETF#88 Meeting, Nov. 3, 2013, 14 pages.
Fahmy Suhaib A., et al., "Virtualized FPGA Accelerators for Efficient Cloud Computing," The University of Warwick, Cloud Computing Technology and Science (CloudCom), IEEE 7th International Conference, Nov. 30, 2015, 7 pages.
Hejtmanek, Lukas, "Scalable and Distributed Data Storage," is.muni.cz, Jan. 2005, pp. 1-58.
Hendrickson, Scott., et al. "Serverless Computation with OpenLambda." Elastic 60, University of Wisconson, Madison, Jun. 20, 2016, 7 pages.
Jain, Abhishek Kumar, "Architecture Centric Coarse-Grained FPGA Overlays," Nanyang Technological University, Jan. 2017, 195 pages.
Kachris, Christoforos, et al., "A Survey on Reconfigurable Accelerators for Cloud Computing," Conference Paper, Aug. 2016, 11 pages.
Kidane Hiliwi Leake, et al., "NoC Based Virtualized FPGA as Cloud Services," 3rd International Conference on Embedded Systems in Telecommunications and Instrumentation (ICESTI'16), Oct. 24, 2016, 6 pages.
Neshatpour, Katayoun, et al., "Energy-Efficient Acceleration of Big Data Analytics Applications Using FPGAs," IEEE International Conference, Oct. 29, 2015, 9 pages.
Orellana, Julio Proano, et al., "FPGA-Aware Scheduling Strategies at Hypervisor Level in Cloud Environments," Hindawi Publishing Corporation, Scientific Programming, vol. 2016, Article ID 4670271, May 22, 2016, 13 pages.
Pierre-Louis, Marc-Arthur, "OpenWhisk: A quick tech preview," DeveloperWorks Open, IBM, Feb. 22, 2016, 7 pages.
Putnam, Andrew, et al., "A Reconfigurable Fabric for Accelerating Large-Scale Datacenter Services," Computer Architecture (ISCA), 41st International Symposium, Jun. 2014, 12 pages.
Weissman, Jon B. et al., "Optimizing Remote File Access for Parallel and Distributed Network Applications," users@cs.umn.edu Oct. 19, 2017, pp. 1-25.
Westerbeek, Michiel, "Serverless Server-side Rendering with Redux-Saga," medium.com, Dec. 10, 2016, pp. 1-6.
Wikipedia contributors, "Serverless Computing," Wikipedia, The Free Encyclopedia, Jun. 11, 2017, 4 pages.
Yadav, Rishi, "What real cloud-native apps will look like," Crunch Network, Aug. 3, 2016, 8 pages.

* cited by examiner

United States Patent No. US 11,016,673 B2

OPTIMIZING SERVERLESS COMPUTING USING A DISTRIBUTED COMPUTING FRAMEWORK

CROSS-REFERENCE TO RELATED APPLICATION

The instant application is a Continuation of, and claims priority to, U.S. patent application Ser. No. 15/943,640 entitled OPTIMIZING SERVERLESS COMPUTING USING A DISTRIBUTED COMPUTING FRAMEWORK filed Apr. 2, 2018, the contents of which are herein incorporated by reference in its entirety.

BACKGROUND

1. Technical Field

The subject technology generally relates to serverless computing and more particularly, to optimization of serverless workflows achieved by converting selected serverless application tasks for processing using a distributed computing framework (DCF).

2. Introduction

Cloud computing aggregates physical and virtual compute, storage, and network resources in a "cloud," and offers users ways to utilize the resources. Serverless computing (SLC) is a cloud-based technology that offers a high level of compute abstraction, with a great deal of scalability. In SLC deployments, developers no longer need to worry about the underlying physical or even virtual infrastructure in the cloud. Often, serverless computing frameworks are offered as a service, e.g., Amazon Web Services (AWS) Lambda (a compute service that runs code in response to events (making serverless computing an event-driven framework) and automatically manages the compute resources required by the code). Developers can pay for compute time consumed. Code can be uploaded to the serverless computing framework, and the serverless computing framework handles the rest.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
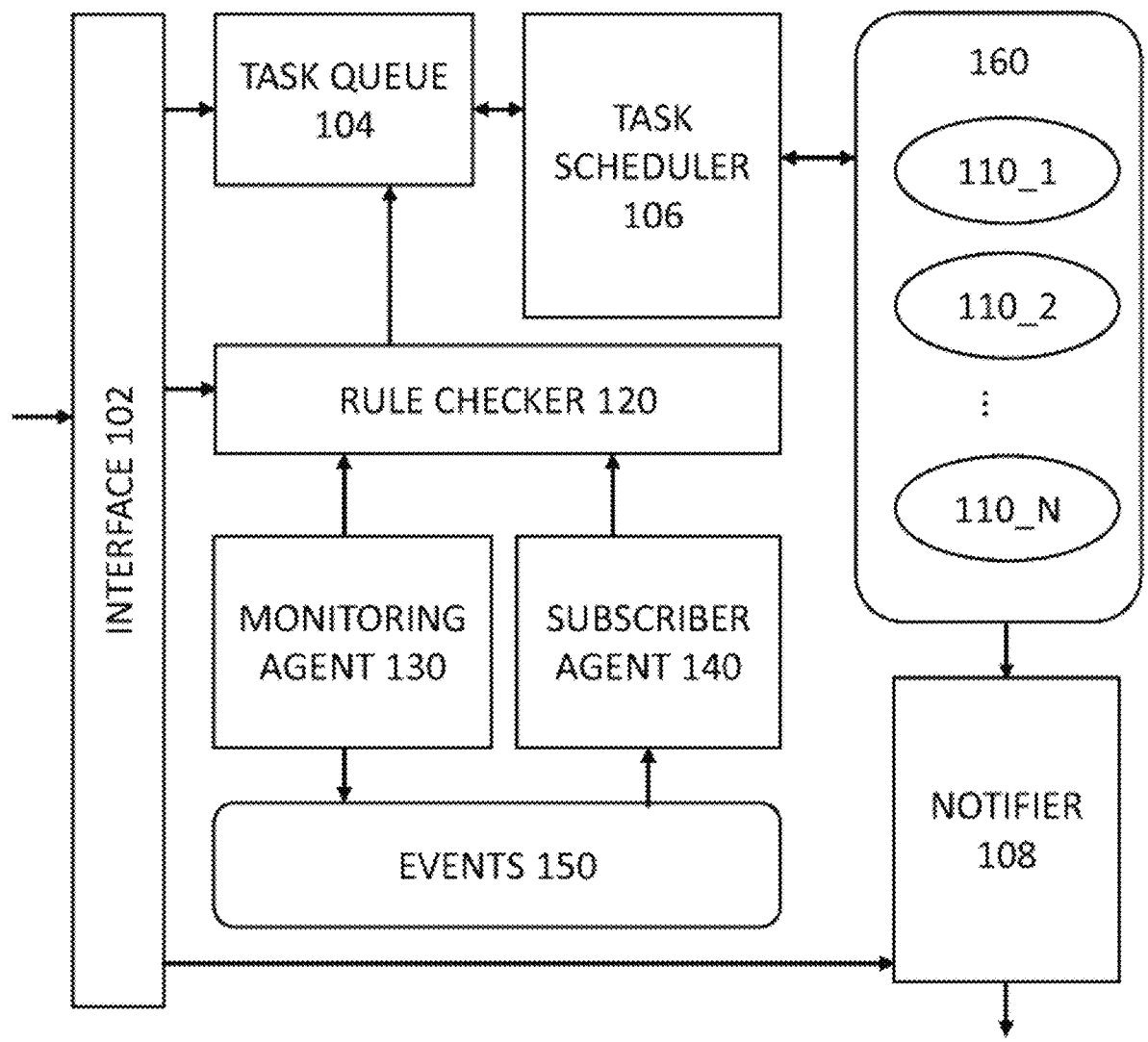
FIG. 1 illustrates an example of a serverless computing system, according to some aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview:

The disclosed technology relates to the optimization of Serverless Computing (SLC) workflows. In one aspect, the technology relates to a process for optimizing SLC workflows by performing steps for receiving an SLC job comprising a plurality of SLC tasks, executing the SLC tasks to determine at least a latency metric and a throughput metric for the SLC tasks, and determining if one or more of the SLC tasks should be converted to a Distributed Computing Framework (DCF) format based on the latency metric and the throughput metric.

In other aspects, the disclosed technology relates to systems for optimizing SLC workflows, wherein the system includes one or more processors and a computer-readable medium including instructions stored therein. When executed by the processors, the instructions cause the processors to perform operations including: receiving an SLC job comprising a plurality of SLC tasks, executing the SLC tasks to determine at least a latency metric and a throughput metric for the SLC tasks, and determining if the SLC job should be converted to a Distributed Computing Framework (DCF) job format based on the latency metric and the throughput metric.

In yet another aspect, the disclosed technology provides a non-transitory computer-readable storage medium comprising instructions stored therein, which when executed by one or more processors, cause the processors to perform operations including: receiving an SLC job comprising a plurality of SLC tasks, executing the SLC job to determine at least a latency metric and a throughput metric for the SLC job; and determining if the SLC job should be converted to a Distributed Computing Framework (DCF) job based on the latency metric and the throughput metric.

DESCRIPTION

Serverless computing works by having developers or users upload an application or piece of code to a serverless computing system (e.g., serverless computing platform or environment), and the serverless computing system provisions physical and virtual resources to run the code without having to burden the developer or user with the setup of hosts or workers. i.e., networked hardware resources in the cloud, including compute, storage, and network resources. In some contexts, serverless computing is called "function as a service." The cloud provider fully manages underlying resources and automatically determines when to start and stop those resources based on a specification of the computation needed. The user is completely hidden from the underlying infrastructure and does not need to purchase, provision, or manage any of the required computing resources.

To use a serverless computing environment, a developer or user can upload a piece of code to be executed. The developer or user is abstracted from the setup and execution of the code in the networked hardware resources in the cloud. Serverless computing aims to provide a higher level of compute abstraction which allows developers and users to not have to worry about the underlying physical or even virtual infrastructure.

For some time, the code executed on the serverless computing environment has been lightweight scripts that do not require a lot of computing resources. As a result, users are able to execute code quickly and easily on the serverless system. However, the needs of users to run more data intensive scripts/jobs are growing as serverless computing gains popularity.

Although SLC is known for its flexibility and ease of handling event driven applications, SLC job computing performance and reliability can suffer for certain data/compute intensive use cases. SLC performance can particularly suffer in streaming scenarios, when handling large volumes of input data and/or when receiving data for complex applications. For instance, machine learning or artificial intelligence applications can involve data intensive scripts that require large amounts of data processing. The scripts can easily increase processing time and eat up computing resources. At the same time, users increasingly expect computing providers to offer serverless systems that run quickly and efficiently. Serverless computing providers want to ensure a certain service level for the users, while maintaining efficiency of the serverless computing system to manage overall costs for providing the serverless computing system.

Aspects of the disclosed technology address the foregoing need by leveraging computational efficiencies provided by Distributed Computing Framework (DCF) workflow implementations. In some aspects, SLC workflows can be improved by converting all (or a portion) of the SLC job tasks into a DCF format, for example, so that the tasks can be computed using a distributed computing framework.

In some aspects, SLC jobs that that include particularly high latency or high throughput tasks can be automatically transformed into DCF job format for processing in a DCF pipeline. The SLC to DCF job transformation can be performed automatically and without user knowledge or involvement, thereby improving computing resource services, without the need to burden the user with the need to learn new implementation commands or procedures. As discussed in further detail below, the decision to convert a received SLC job into a DCF format can be based on task attributes of the submitted SLC job and/or based on metrics computed when SLC job execution is simulated. For example, latency and throughput metrics may be calculated for one or more tasks comprising an SLC job, and used to determine if DCF conversion yield any performance improvement.

FIG. 1 illustrates an example of a serverless computing system, according to some aspects of the disclosure. Serverless computing system 100 includes interface 102, task queue 104, task scheduler 106, and networked hardware resources 160 having workers 110_1, 110_2, . . . 110_N.

Interface 102 allows a developer or user to interact with the serverless computing system 100 via a predefined application programming interface (API). Through interface 102, a user can provide a task definition to create an action (associated with some piece of code or script) for the serverless computing system 100 to execute. Interface 102 can include command line and/or a graphical user interface to facilitate user interactions, such as inputting and specifying task definitions. Interface 102 is an abstraction layer that can allow a developer or user to use different serverless computing resources and/or environments, for example, that are deployed in one or public and/or private cloud(s).

Task queue 104 can include one or more data structures that store tasks (SLC tasks) or sets of SLC tasks (e.g., SLC jobs or applications) to be executed by serverless computing system 100. SLC tasks stored in task queue 104 can come from different sources, including from a developer/user via interface 102. An SLC task can be considered an execution unit or an action that can include a set of binary codes and a shell script. Task scheduler 106 is configured schedule and decide how to execute SLC tasks in task queue 104. Task scheduler 106 can be responsible for assigning tasks to any one of workers 110_1, 110_2, . . . 110_N. In some embodiments, task scheduler 106 can optimize and assign SLC tasks from task queue 104. SLC task assignments can be performed by task scheduler 106 according to a suitable assignment scheme, e.g., an assignment scheme that assigns task to random workers.

Serverless computing system 100 (having workers 110_1, 110_2, . . . 110_N) can include different serverless computing environments and/or cloud computing environments with heterogeneous characteristics. For instance, networked hardware resources 160 having workers 110_1, 110_2, . . . 110_N can be implemented in different environments, including but not limited to, AWS Lambda, IBM OpenWisk, Google Cloud Functions, Windows Azure Functions, OpenStack, local Docker environment (e.g., private cloud with support for implementing Containers), local environment (e.g., private cloud) with support for virtual machines, local environment (e.g., private cloud) with support for microservices, etc. Networked hardware resources 160 can include resources in one or more of the following: one or more public clouds, one or private clouds, and one or more hybrid clouds (having both public and private clouds).

Interface 102 abstracts APIs from the different environments and enables the integration of different environments under a unified API. Interface 102 can also expose the workers 110_1, 110_2, . . . 110_N in a way that enables developers/users to access the environments or define rules based on the environments. Task scheduler 106 can select one of the available workers 110_1, 110_2, . . . 110_N from any suitable serverless computing environment (private cloud, public cloud, local Docker, etc.), since serverless computing system 100 is implemented on top of many different serverless computing environments and/or cloud computing environments. This aspect provides a great deal of flexibility for the developer to execute tasks.

In some embodiments, serverless computing system 100 can be configure to automatically make SLC transformation decisions for one or more SLC tasks submitted by the developer/user, e.g., as part of an SLC job. For example, having a particularly high latency or throughput can be identified and selected for transformation into DCF format, e.g., to be processed in a DCF pipeline. By performing automatic DCF conversions for high latency/throughput SLC tasks, hybridized SLC/DCF computing pipelines can be used to optimize performace and reliability of applications defined with pure SLC scripts. As discussed in further detail below, such solutions enable developers/users to prototype and test ideas easily using just SLC scripts, and to transparently shift a subset of the scripts into a more reliable and efficient pipelines based on mature distributed computing frameworks, for example, when running the application in a production environment.

Figure 2:
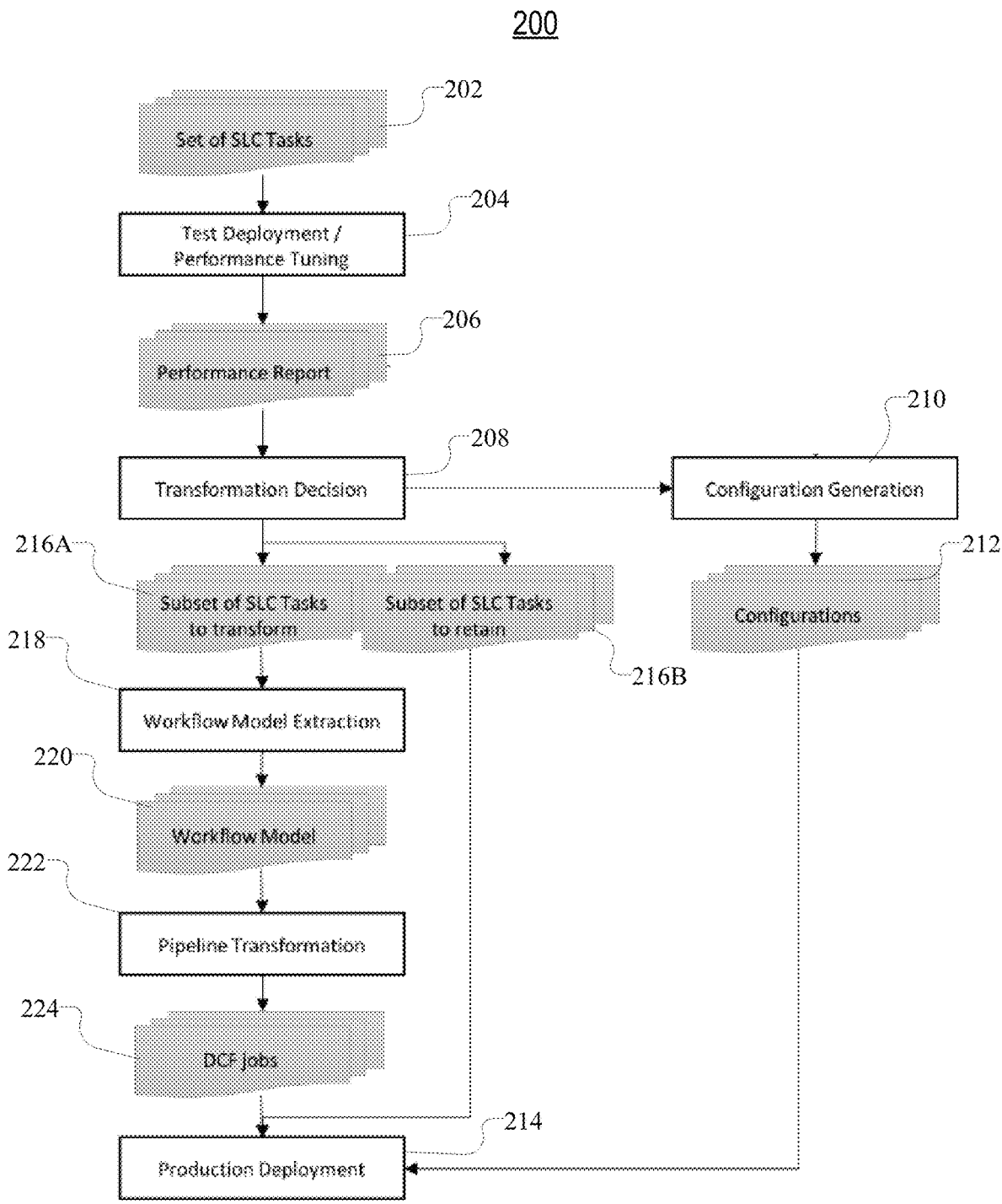
FIG. 2 illustrates an example flow chart of a process for converting Serverless Computing (SLC) tasks into a Distributed Computing Framework (DCF) format, according to some aspects of the disclosure.

FIG. 2 illustrates a flow chart of an example process 200 for converting one or more SLC tasks into a Distributed Computing Framework (DCF) format. Process 200 begins when a set of SLC tasks are submitted (e.g., by a user or developer) to a Serverless Computing Environment, such as serverless computing system 100, discussed above (202). The SLC tasks may define an application, for example, that is represented as a workflow or chaining of SLC tasks. In some aspects, a defining script associated with the SLC tasks may be required to follow pre-defined rules, for example, so that it can be expressed as a collection of functions connected by a workflow. Depending on the embodiment, these restrictions can be implemented by providing a Domain Specific Language (DSL) with the system.

Subsequently, the SLC tasks are put in a testing deployment for performance tuning (204). During testing deployment, different parallelisms/combinations of each component for the SLC tasks are implemented, and a summary of performance information and needed resources for each component is generated in a report (206). Following the transformation decision, a configuration generation process is used to generate the configurations for the DCF formatted tasks/jobs based on the performance report and the transformation decision (210, 212). The resulting configurations are provided directly for production deployment (214) to be combined with the one or more transformed tasks, as carried out in parallel in steps 218-224, discussed further below.

Following the transformation decision (208), the submitted SLC tasks can be categorized into two sets: a first subset of SLC tasks for which DCF transformation can improve performance (216A), and a second subset of SLC tasks that should remain unconverted (216B). The second subset of SLC tasks that are not transformed (216B) can be directly provided for production deployment (214).

For the subset of the SLC tasks to be transformed (216A), a function-level workflow is extracted (218). In some instances, the function-level workflow can be represented as a graph or model (220), as discussed in further detail below with respect to FIGS. 3B and 3C.

Once the function level workflow has been extracted, a pipeline transformation can be used to further transform the workflow to a target (DCF) pipeline (222). During pipeline transformation (222), certain functions/behaviors can be automatically converted and optimized for DCF, for example, to take advantage of a distributed computing environment. By way of example, "for loops" can be turned into map functions so that they can be easily distributed, and functions that perform serial processing can be modified to perform batch processing. In some implementations, functional/behavioral modifications can be aided with the help of DSL In some pipeline transformation implementations, certain caching components can be automatically added, for example, so that trigger-based relationships among SLC tasks can be modified into continuous connections between corresponding DCF jobs. Additionally, the behaviors of input/output proposed functions in the original SLC scripts can be automatically altered, for example, to communicate through newly created caches, instead of triggering.

Finally, after DCF formatted tasks (DCF jobs) are output by the transformation pipeline (224), the converted jobs, retained SLC tasks (216B), and configurations (212) are combined into a final production deployment (214). As discussed above, the hybrid SLC/DCF pipeline can improve SLC job performance by leveraging DCF for selected (computationally expensive) SLC tasks.

Figure 3A:
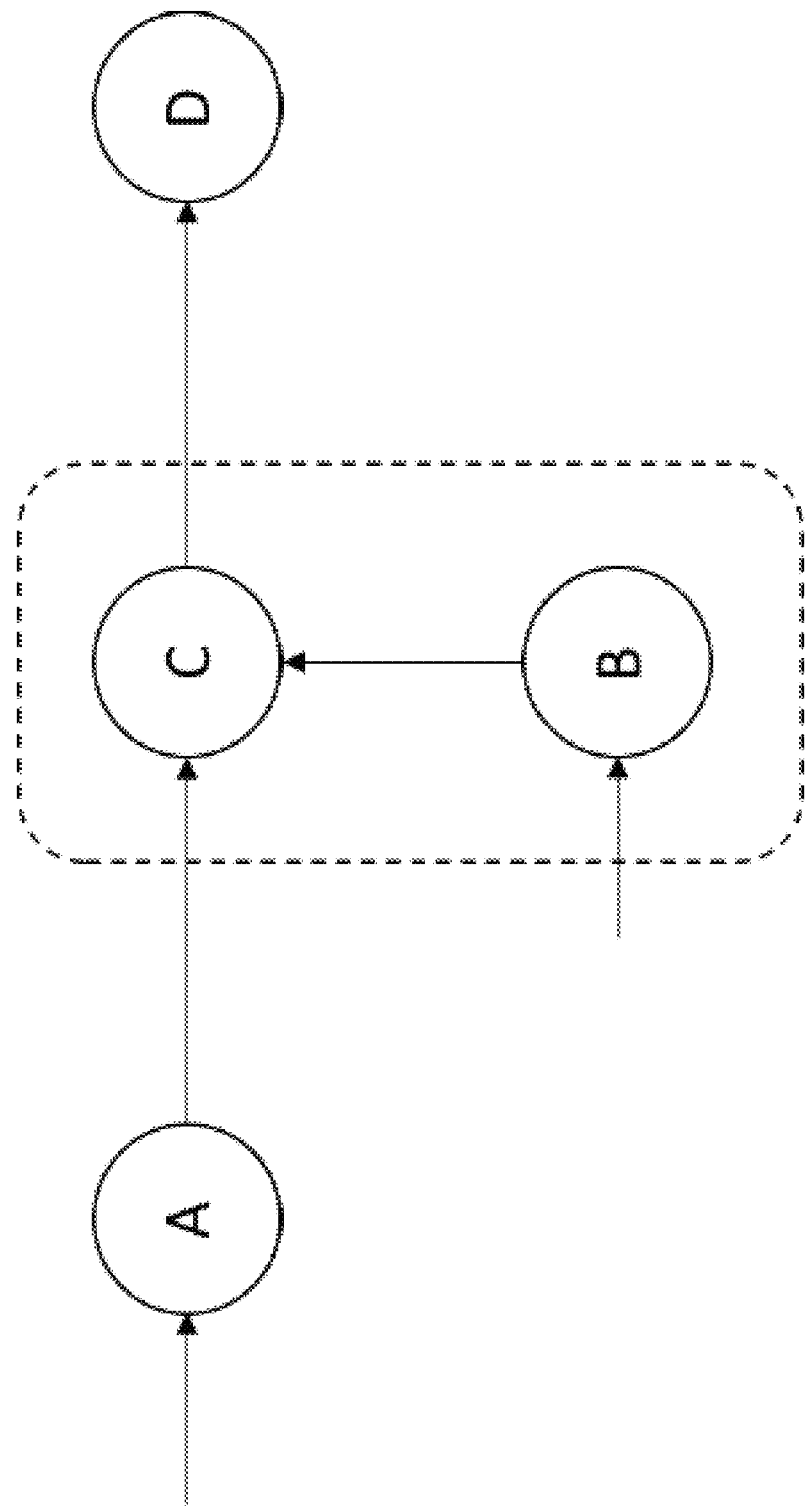
FIG. 3A conceptually illustrates functional nodes of an example SLC messaging application that can be optimized through conversion to a DCF job, according to some aspects of the technology.

FIG. 3A conceptually illustrates an example application that can be optimized using an SLC to DCF transformation of the subject technology. The initial application includes four separate SLC tasks: A, B, C, and D. In this example, Task A is configured to listen to a rest API where batches of messages are sent by a user. When called, Task A triggers Task C, and passes data to it. Task B is configured to listen to a message queue, and when new messages arrive, to parse the new messages and then trigger task C. Task C is configured to process the messages, when triggered, using a relatively long running process. When certain conditions are met, Task C triggers Task D, and Task D sends a report back to the.

Example pseudo code for each of tasks A, B, C and D is as follows:

```
SLC task A:
  workflow := [a]
  function a(data):
    trigger task_B(data)
SLC task B:
  workflow := [b1, b2, b3]
  function b1( ):
    data = retrieve_data( )
    return data
  function b2(data):
    parsed_data = parse_data(data)
    return parsed_data
  function b3(parse_ddata)
    trigger task_C(parsed_data)
SLC task C:
  workflow := [c1, c2]
  function c1(batch_data):
    batch_summary = process(batch_data)
    return batch_summary
  function c2(batch_summary):
    if any summary in batch_summary meets condition_x:
      trigger task_D(summary)
SLC task D:
  workflow := [d]
  function d(data):
    send_report(data)
```

In the example SLC application illustrated in FIG. 3A, testing of the various SLC tasks can be used to identify what tasks, if any, could benefit from conversion into a DCF format. As discussed in further detail below, transformation decisions can be made based on characteristics of an individual task, and in some instances can be based on statistics or other metrics calculated for a particular task.

By way of example, high latency or high throughput tasks may be identified and flagged for DCF conversion/optimization. A predetermined threshold for latency (e.g., a latency threshold), and/or a predetermined threshold for throughput (e.g., a throughput threshold) can be used to determine what SLC tasks should be abstracted and transformed for processing in a DCF pipeline. Depending on the desired implementation, the predetermined latency/throughput thresholds may be manually set (e.g., by a developer or system administrator), or may be dynamically determined, for example, based on the computational load of the serverless system and/or characteristics of the received SLC tasks or application.

Further to the example of FIG. 3A, it may be determined that Task A and Task B, which have low latency and low throughput, do not need to be optimized for DCF. However, Task B continuously receives messages from a message queue, and Task C is continuously triggered (by Task B), and takes a long time to process. Therefore, it may be decided that Task B and Task C should be transformed for processing in a DCF pipeline.

Figure 3B:
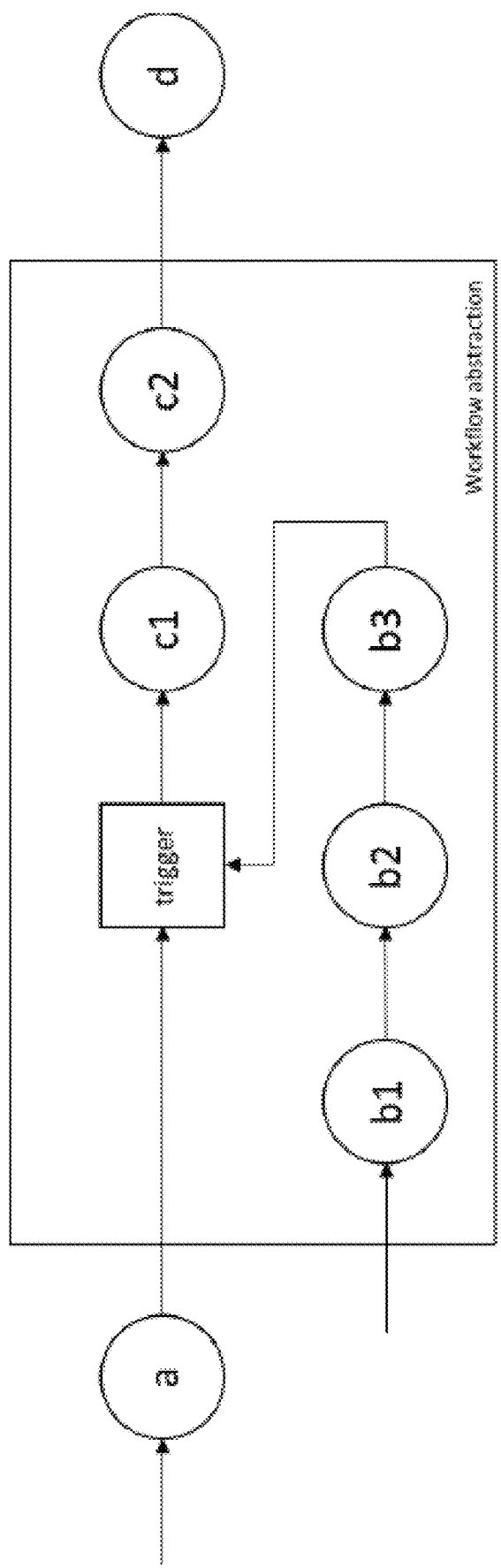
FIG. 3B illustrates a function level workflow graph that is extracted from the messaging application depicted in FIG. 3A, according to some aspects of the technology.

FIG. 3B illustrates a functional level workflow of the messaging application depicted in FIG. 3A, with workflows of Task B and Task C extracted for optimization in a DCF pipeline. After the extraction illustrated by FIG. 3B, the workflow graph is passed to a transformation executor (e.g., pipeline transformation 222, discussed above) for transformation into a DCF pipeline.

Figure 3C:
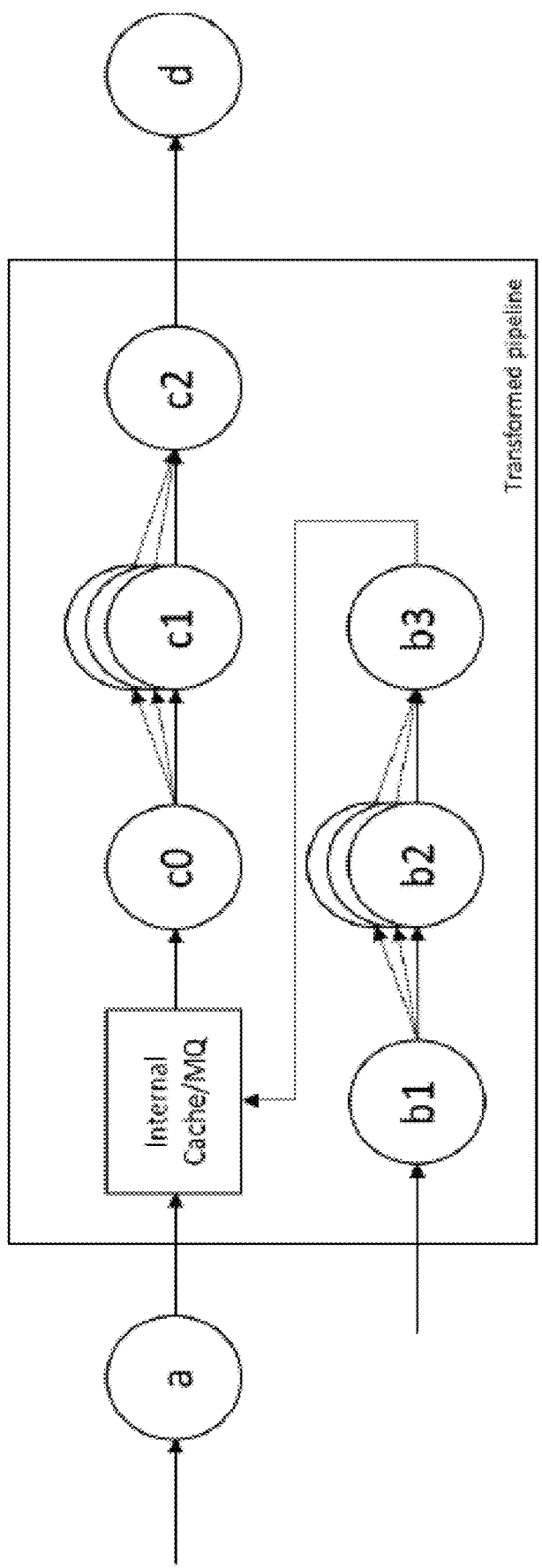
FIG. 3C illustrates the function level workflow of FIG. 3B after it has been transformed for execution in a DCF environment, according to some aspects of the technology.

FIG. 3C illustrates a function level workflow of FIG. 3B after it has been transformed for execution in a DCF environment. In this example, the functions of Task B and Task C are translated into two map-reduced jobs. In this example, the triggering of function C is also replaced by a continuous data connection through an internal cache or messaging queue. As a result, the output of A and B is replaced by a cache writing function, and a cache reading function is added before function C, e.g., as its input. Additionally, after transformation, the input of function B can be replaced by a batch reader, e.g., for reading one message at a time, as was done in the original SLC application. After all necessary SLC tasks have been transformed into DCF format, the resulting DCF pipeline, along with the remaining SLC tasks can be deployed in a production environment.

Figure 4:
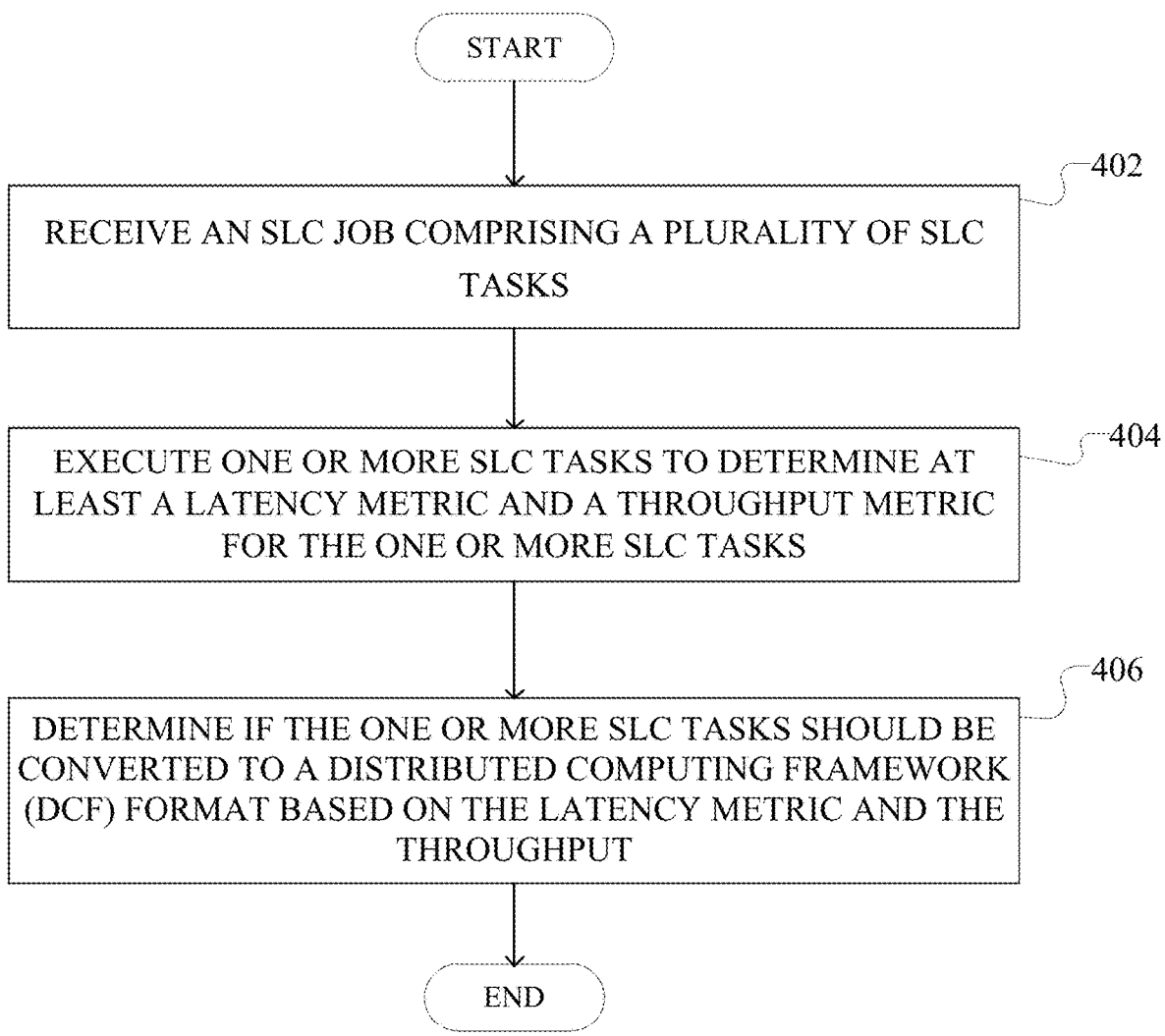
FIG. 4 illustrates steps of an example process for optimizing a serverless job, according to some aspects of the technology.

FIG. 4 illustrates steps of an example process 400 for optimizing a one or more serverless tasks (SLC tasks or SLC jobs), according to some aspects of the technology. Process 400 begins with step 402 in which an SLC job comprising multiple SLC tasks is received. As used herein, SLC job can refer to one or more SLC tasks, for example, that represent all (or a part) of executable code for an application that is provided for execution on a serverless system, such as serverless computing system 100 discussed above with respect to FIG. 1.

In step 404, one or more of the SLC tasks are executed to determine various statistics (performace metrics) associated with respective task execution. Although the metrics measured can depend on the type of SLC task submitted and/or on the desired implementation, in some aspects, latency and/or throughput metrics are determined. Latency metrics can reflect an amount of time required for a corresponding SLC task to execute. Throughput metrics can reflect a relative frequency of function calls i.e., the number of time a particular function is triggered during the course of application operation. Depending on implementation various other metrics or characteristics may be measured, such as, the relationships and/or dependencies between SLC tasks. SLC tasks having higher throughput and/or latency metrics may be good candidates for DCF conversion, as performance for such tasks can often be improved though execution in a DCF pipeline, as opposed to an SLC pipeline.

In step 406, it is determined if one or more of the SLC tasks should be converted to a DCF format. SLC task conversion decisions can be made based on the metrics measured in step 404, i.e., using the latency metric and/or the throughput metric. For example, predetermined thresholds can be used to drive SLC to DCF conversion decisions, wherein each metric can be compared to a corresponding predetermined threshold, and if it exceeds the threshold, DCF transformation can commence. Either the latency metric or the threshold metric can be used to determine if DCF transformations should proceed. By way of further example, a measured latency metric for a given SLC task can be compared to a predetermined latency threshold, if it exceeds the threshold, then DCF transformation is performed for that SLC task. Similarly, a measured throughput metric for a given SLC task can be compared to a predetermined throughput threshold, if it exceeds the threshold, then DCF transformation can be performed for the SLC task. In some aspects, the latency threshold and the throughput threshold must both be exceeded by the corresponding measured metric before DCF transformation can commence.

Although a latency metric and threshold metrics provide examples of SLC task statistics that can be used to inform DCF transformation decisions, the use of other types of characteristics and/or statistics is complicated. For example, SLC task relationships, such as interdependencies between different SLC tasks, or their corresponding functions, can be used to determine if DCF conversion should be performed.

In some instances, an SLC application transformation can be simulated by performing DCF pipeline conversions on different combinations of SLC tasks within the SLC job. In another aspect, performance data collected from simulated DCF transformations can be used to determine if a DCF pipeline transformations should be performed for a respective application.

Figure 5:
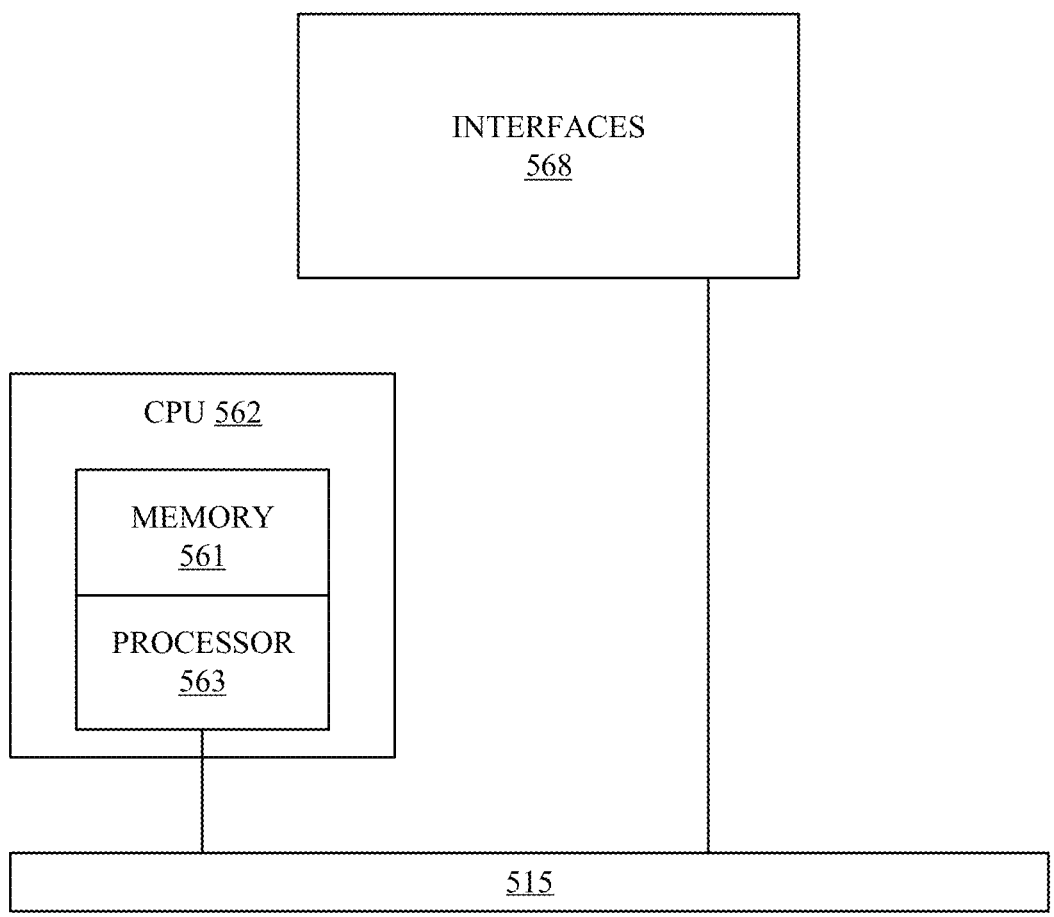
FIG. 5 illustrates an example of an electronic system with which some aspects of the subject technology can be implemented.

FIG. 5 illustrates an example of an electronic system with which some aspects of the technology can be implemented. Specifically, FIG. 5 illustrates an example network device 510 that can include, but is not limited to a server, a node in a distributed computing system or a mobile device, such as a smart phone, a notebook computer, or a tablet computing device.

Network device 510 includes a master central processing unit (CPU) 562, interfaces 568, and a bus 515 (e.g., a PCI bus). When acting under the control of appropriate software or firmware, the CPU 562 is responsible for executing packet management, error detection, and/or routing functions. CPU 562 can accomplish these functions under the control of software including an operating system and other applications software. CPU 562 can include one or more processors 563 such as a processor from the Motorola family of microprocessors or the MIPS family of microprocessors. In an alternative embodiment, processor 563 is specially designed hardware for controlling the operations of device 510. In a specific embodiment, a memory 561 (such as non-volatile RAM and/or ROM) also forms part of CPU 562. However, there are many different ways in which memory could be coupled to the system.

The interfaces 568 can be provided as interface cards (sometimes referred to as "line cards"). Generally, they control the sending and receiving of data packets over the network and sometimes support other peripherals used with a router. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, Asynchronous Transfer Mode (ATM) interfaces, High-Speed Serial Interface (HSSI) interfaces, Packet over SONET/SDH (POS) interfaces, Fiber Distributed Data Interfaces (FDDI) and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master CPU 562 to efficiently perform routing computations, network diagnostics, security functions, etc.

Although the system shown in FIG. 5 is one specific network device of the present embodiments, it is by no means the only network device architecture on which the present embodiments can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 561) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Although the exemplary embodiment described herein employs storage device 460, it should be appreciated by those skilled in the art that other types of computer readable media which can store data that are accessible by a computer, such as magnetic cassettes, flash memory cards, digital versatile disks, cartridges, random access memories (RAMs) 450, read only memory (ROM) 440, a cable or wireless signal containing a bit stream and the like, may also be used in the exemplary operating environment. Non-transitory computer-readable storage media expressly exclude media such as energy, carrier signals, electromagnetic waves, and transitory signals per se.

To enable user interaction with the computing device 510, interfaces 568 can represents any number of input mechanisms, such as a microphone for speech, a touch-sensitive screen for gesture or graphical input, keyboard, mouse, motion input, speech and so forth. Interfaces 568 can also represent one or more output devices or mechanisms known to those of skill in the art. In some instances, multimodal systems enable a user to provide multiple types of input to communicate with the computing device 510.

For clarity of explanation, the illustrative system embodiment is presented as including individual functional blocks including functional blocks labeled as a "processor" or processor 563. The functions these blocks represent may be provided through the use of either shared or dedicated hardware, including, but not limited to, hardware capable of executing software and hardware, such as a processor 563, that is purpose-built to operate as an equivalent to software executing on a general purpose processor. For example, the functions of one or more processors may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The processor 563 can practice all or part of the recited methods, can be a part of the recited systems, and/or can operate according to instructions in the recited non-transitory computer-readable storage media. Such logical operations can be implemented as modules configured to control the CPU 562 or processor 563 can be configured to perform particular functions according to the programming of the module. By way of example, one or more processors can be configured to execute operations including: receiving an SLC job including a plurality of SLC tasks, executing one or more of the SLC tasks in the SLC job to determine a latency metric and a throughput metric for the one or more SLC tasks, and determining if the one or more SLC tasks should be converted to a Distributed Computing Framework (DCF) format based on the latency metric and the throughput metric. In some aspects, the operations can further include automatically converting the one or more SLC tasks to DCF format.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method for optimizing a Serverless Computing (SLC) workflow, comprising:
   receiving a SLC job comprising a plurality of SLC tasks, each of the plurality of SLC tasks in a first format of a first type;
   executing at least one of the plurality of SLC tasks in the SLC job to determine at least one metric for the plurality of SLC tasks;
   comparing the at least one metric with a predetermined threshold;
   in response to the at least one metric exceeding the predetermined threshold, converting at least one SLC task of the plurality of SLC tasks to a second format of a second type, wherein the second type is different than the first type; and
   processing, in pipelines, the SLC job as a combination of the plurality of SLC tasks in the second format and in the first format.

2. The computer-implemented method of claim 1, wherein the converting comprises automatically converting the at least one of the plurality of SLC tasks to the second format, wherein the second format of the second type is a Distributed Computing Framework (DCF) format.

3. The computer-implemented method of claim 2, wherein automatically converting the at least one of the plurality of SLC tasks to the DCF format further comprises:
   performing a map reduce function on the at least one of plurality of SLC tasks.

4. The computer-implemented method of claim 1, wherein at least one metric includes a latency metric determined based on a time period required to execute the plurality of SLC tasks.

5. The computer-implemented method of claim 1, wherein the at least one metric is a throughput metric determined based on a frequency that the plurality of SLC tasks are triggered.

6. The computer-implemented method of claim 1, wherein the converting further comprises:
   comparing a latency metric to a predetermined latency threshold; and
   converting the at least one of the plurality of SLC tasks to the second format when the latency metric exceeds the predetermined latency threshold, wherein the second format of the second type is a Distributed Computing Framework (DCF) format.

7. The computer-implemented method of claim 1, wherein the converting further comprises:
   comparing a throughput metric to a predetermined throughput threshold; and
   converting the at least one of the plurality of SLC tasks to the second format when the throughput metric exceeds the predetermined throughput threshold, wherein the second format of the second type is a Distributed Computing Framework (DCF) format.

8. At least one non-transitory media containing instructions, which when executed by at least one processor, cause the at least one processor to:
   receive a Serverless Computing (SLC) job comprising a plurality of SLC tasks, each of the plurality of SLC tasks in a first format of a first type;
   execute at least one of the plurality of SLC tasks in the SLC job to determine at least one metric for the plurality of SLC tasks;
   compare the at least one metric with a predetermined threshold;
   in response to the at least one metric exceeding the predetermined threshold, convert at least one SLC task of the plurality of SLC tasks to a second format of a second type, wherein the second type is different than the first type; and
   process, in pipelines, the SLC job as a combination of the plurality of SLC tasks in the second format and in the first format.

9. The at least one non-transitory media of claim 8, wherein the conversion of the at least one of the plurality of SLC tasks to the second format is automatic and, wherein the second format of the second type is a Distributed Computing Framework (DCF) format.

10. The at least one non-transitory media of claim 9, storing further instructions, which when executed by the at least one processor causes the at least one processor to:
    perform a map reduce function on the at least one of the plurality of SLC tasks.

11. The at least one non-transitory media of claim 8, wherein at least one metric includes a latency metric determined based on a time period required to execute the plurality of SLC tasks.

12. The at least one non-transitory media of claim 8, wherein the at least one metric is a throughput metric determined based on a frequency that the plurality of SLC tasks are triggered.

13. The at least one non-transitory media of claim 8, storing further instructions, which when executed by the at least one processor causes the at least one processor to:
    compare a latency metric to a predetermined latency threshold; and
    convert the at least one of the plurality of SLC tasks to the second format when the latency metric exceeds the predetermined latency threshold, wherein the second format of the second type is a Distributed Computing Framework (DCF) format.

14. The at least one non-transitory media of claim 8, storing further instructions, which when executed by the at least one processor causes the at least one processor to:
    compare a throughput metric to a predetermined throughput threshold; and
    convert the at least one of the plurality of SLC tasks to the second format when the throughput metric exceeds the predetermined throughput threshold, wherein the second format of the second type is a Distributed Computing Framework (DCF) format.

15. A system, comprising:
    at least one processor; and
    at least one non-transitory memory containing instructions, which when executed by the at least one processor, causes the at least one processor to:
    receive a Serverless Computing (SLC) job comprising a plurality of SLC tasks, each of the plurality of SLC tasks in a first format of a first type;
    execute at least one of the plurality of SLC tasks in the SLC job to determine at least one metric for the plurality of SLC tasks;
    compare the at least one metric with a predetermined threshold;
    in response to the at least one metric exceeding the predetermined threshold, convert at least one SLC task of the plurality of SLC tasks to a second format of a second type, wherein the second type is different than the first type; and
    process, in pipelines, the SLC job as a combination of the plurality of SLC tasks in the second format and in the first format.

16. The system of claim 15, further comprising instructions, which when executed by the at least one processor, causes the at least one processor to:
   perform a map reduce function on the at least one of the plurality of SLC tasks.

17. The system of claim 15, wherein at least one metric includes a latency metric determined based on a time period required to execute the plurality of SLC tasks.

18. The system of claim 15, wherein the at least one metric is a throughput metric determined based on a frequency that the plurality of SLC tasks are triggered.

19. The system of claim 15, further comprising instructions, which when executed by the at least one processor, causes the at least one processor to:
   compare a latency metric to a predetermined latency threshold; and
   convert the at least one of the plurality of SLC tasks to the second format when the latency metric exceeds the predetermined latency threshold, wherein the second format of the second type is a Distributed Computing Framework (DCF) format.

20. The system of claim 15, further comprising instructions, which when executed by the at least one processor, causes the at least one processor to:
   compare a throughput metric to a predetermined throughput threshold; and
   convert the at least one of the plurality of SLC tasks to the second format when the throughput metric exceeds the predetermined throughput threshold, wherein the second format of the second type is a Distributed Computing Framework (DCF) format.

* * * * *